June 11, 1963 V. G. REILING 3,093,162
PLASTIC LINED PERFORATED METAL TUBE
Filed June 29, 1959
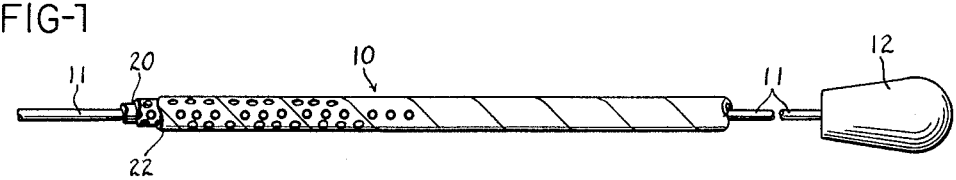
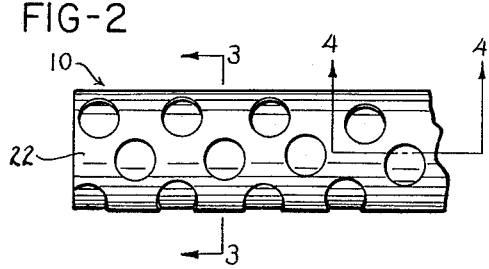
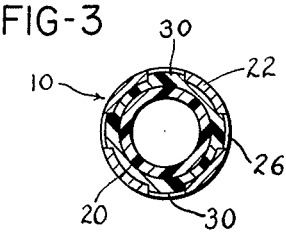
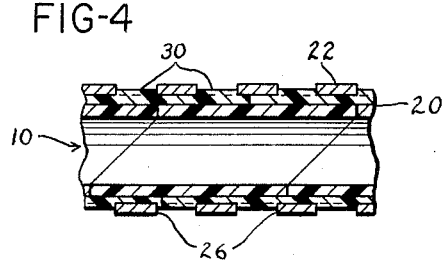
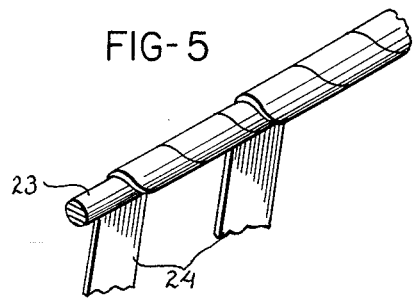
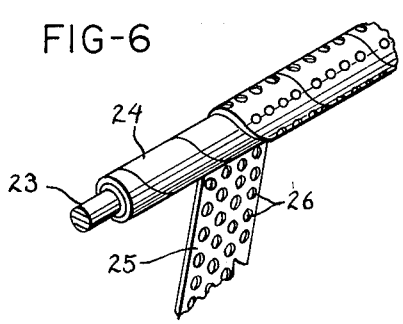
INVENTOR.
VICTOR G. REILING
BY Maréchal, Biebel, French & Bugg
ATTORNEYS

United States Patent Office 3,093,162
Patented June 11, 1963

3,093,162
PLASTIC LINED PERFORATED METAL TUBE
Victor G. Reiling, Dayton, Ohio, assignor, by mesne assignments, to The Duriron Company, Inc., Dayton, Ohio, a corporation of New York
Filed June 29, 1959, Ser. No. 823,725
4 Claims. (Cl. 138—150)

This invention relates to the fabrication of articles of sintered plastic material.

The invention has special relation to articles fabricated from fluorocarbon polymers, such as the polytetrafluoroethylene resins sold under the trade name Teflon, which are available commercially in powdered form and which are fabricated by preforming under pressure to compact the powder to the desired shape followed by sintering or baking under relatively high temperature. These materials have excellent bearing properties as a result of their inherent antifrictional characteristics, as well as inertness and low conductivity of heat, and the invention is directed to the fabrication of articles utilizing certain of these properties.

It is a primary object of the present invention to provide a reinforced tubular article suitable for uses such as the case for a control cable wherein the inner wall of the article is composed of a tube of a sintered plastic material of the type outlined above for maximum freedom from friction with respect to the control cable or other member covered thereby, and wherein the outer wall of the article is composed of a metallic sheath confining the plastic material and having multiple indentations in the inner surface thereof which are partially filled with the plastic material to lock the sheath and the plastic inner tube against both axial and angular movement with respect to each other.

An additional object of the invention is to provide a reinforced tubular article as outlined above wherein the sheath is formed of perforated metal, and particularly of spirally wound perforate sheet metal for increased flexibility in the finished article along with the other advantageous features already noted.

Another object of the invention is to provide a method of fabricating a reinforced tubular article as outlined above, and particularly to provide such a method wherein the plastic inner tube component of the article is heated within its metallic sheath under such conditions that portions of its outer surface are permanently deformed into interlocking relation with the indentations in the inner surface of the sheath.

It is also an object of the invention to provide a method as outlined above wherein the inner wall of the article is formed by spirally winding a tape of sintered plastic material on a mandrel to form a tube, and wherein this tube is then heated while confined between the mandrel and a metallic sheath under such conditions and at such temperatures that the resulting expansion of the tube causes the adjacent portions of the tape to bond together and also to cause material in the outer surface of this tube to flow into permanently interlocking relation with indentations in the inner surface of the metallic sheath.

A further object of the invention is to provide a method of fabricating a tubular article generally as outlined above which is especially adapted to the production of relatively large tubes of sintered plastic material of substantial wall thickness and which includes the use of a perforate metallic sheath during fusing of the spirally wound tape but wherein this sheath may thereafter be removed from the finished tube.

Still further objects and advantages of the invention will be apparent from the following description, the accompanying drawing and the appended claims.

In the drawing—
FIG. 1 is a fragmentary elevational view showing a complete assembly of control cable and case therefor produced in accordance with the invention;
FIG. 2 is an enlarged fragment of the cable case of FIG. 1;
FIG. 3 is a section on the line 3—3 of FIG. 2;
FIG. 4 is a fragmentary section on the line 4—4 of FIG. 2; and
FIGS. 5 and 6 are fragmentary views illustrating steps in the method of producing the cable case of FIGS. 1–4 in accordance with the invention.

Referring to the drawing, which illustrates a preferred embodiment of the invention, the control cable assembly shown in FIG. 1 includes a tubular case 10 in which a control cable 11 is mounted for axial and/or angular movement, the cable 11 being shown as having a knob 12 at one end thereof. The purpose of the case 10 is to support the cable 11 for such relative movement with minimum friction or other resistance to the desired movements of the cable. The present invention is directed to the provision of an assembly suitable for uses such as to form the case 10.

Referring to the enlarged views in FIGS. 2–4, the case 10 is shown as comprising one or more inner layers 20 of sintered plastic material and an outer layer or sheath 22 of metal of suitable rigidity and flexibility. Preferred results are obtained in accordance with the invention by forming the inner layer 20 as a tube by winding on a mandrel one or more layers of flat tape of a sintered plastic material such as a Teflon polytetrafluoroethylene resin. This step is shown in FIG. 5 in connection with the mandrel 23 and tape 24, and FIG. 4 shows the tube 20 as formed of two layers of the tape with the edges of the tape in the outer layer overlying approximately the center of the tape in the inner layer.

After the plastic tube 20 has been formed in this manner, it is provided with a closely fitting metallic sheath 22, and this may be accomplished by spirally winding on the tube a strip of sheet metal as shown at 25 in FIG. 6. It is also desired in accordance with the invention that the metal sheath 22 have multiple indentations in its inner surface, and this is readily provided by utilizing a sheet metal strip 25 having multiple perforations 26 therethrough as shown.

After the assembly has been initially produced as just described, the composite metal and plastic article, including this mandrel, is subjected to heating at temperatures sufficiently in excess of the original gel point of the plastic material to effect partial fusion thereof without degeneration, temperatures in a range just above approximately 650° F. being appropriate for this step. The fluorocarbon resins with which the invention is concerned have very much greater coefficients of thermal expansion than metals, and when the composite article is heated as described, the tube 20 will attempt to expand to a much greater extent than the metal sheath 22. However, since it is confined between the mandrel and the metal sheath, it is prevented from uncontrolled expansion, and the result is that the plastic material develops substantial internal pressure causing adjacent portions of the plastic tape to bond together by fusion and also causing portions of the plastic material on the outer surface of the tube 20 to flow into the perforations in the metal sheath.

Due to the conditions just described, after the assembly has cooled following the heating step, a substantial degree of permanent deformation of the plastic material will be found to have taken place, particularly in that at least a portion of the material which has entered the perforations in the metal sheath will remain therein. These interfitting portions are indicated at 30 in FIGS. 3 and 4, and they serve to provide a permanent interlock between the plastic material and the metal sheath which effectively prevents any relative movement of these parts during subsequent use of the article. It is thereafter then merely necessary to withdraw the mandrel and to thread through the article the control cable 11 or whatever member is to be encased, after which the complete assembly is ready for installation as desired, and for some purposes the cable 11 or other member to be encased may itself serve as the mandrel as described.

In the cable case 10, the sheath 22 is retained as a permanent part of the assembly as described, and this is in part desirable as assuring proper reinforcement and support of the relatively thin-walled plastic tube. The method of the invention, however, is also applicable to the fabrication of tubular members of sintered plastic material of relatively large sizes and substantial wall thickness wherewith a perforate metal sheath is employed during fabrication of the tube but may thereafter be removed. For example, if it is desired to fabricate a tube of Teflon resin which is 3 feet in inner diameter, upwards of 10 feet long and with a wall thickness of ⅛ inch, such tube can be produced by the same method steps described above in connection with FIGS. 5–6, using a mandrel 23 of the proper 3-foot diameter and winding the tape 24 to the desired wall thickness of ⅛ inch.

If a spirally wound tube built up as described were subjected to fusing temperatures without any outer support, the tendency of the Teflon resin layers to expand would be effective both radially and axially, and would result in buckling or similar undesired relative axial movement of the layers of tape. However, if the built-up tube is provided with a mandrel and a perforate metal sheath, as shown at 23 and 25 in FIG. 6, before it is heated, they will retain the plastic material against radial swelling except into the perforations 26, and the resulting swelled portions 30 will cooperate with the sheath to lock the plastic material against axial movement. The end result of the combination of these forces is to effect positive fusing of the metal layers of tape without significant change in the dimensions of the tube, and the sheath can then be removed and the projections 30 machined away to impart a smooth outer surface to the tube.

This application is a continuation-in-part of my application Serial No. 752,077 filed July 30, 1958, and now abandoned.

While the article and method herein described constitutes a preferred embodiment of the invention, it is to be understood that the invention is not limited to this precise article and method, and that changes may be made therein without departing from the scope of the invention which is defined in the appended claims.

What is claimed is:

1. A tubular article of the character described comprising a substantially impervious inner tube of sintered plastic material forming an inner exposed surface of said article, a sheath of metal enveloping said plastic tube and having multiple small holes in the inner surface thereof, said sintered plastic material having a coefficient of thermal expansion greater than said sheath of metal, and the material of said plastic tube including integral portions projecting radially outwardly within said holes and cooperating therewith to secure said sheath and said tube against both axial and rotational movement relative to each other.

2. A tubular article of the character described comprising a substantially impervious inner tube of spirally wound tape composed of a sintered plastic material forming an inner exposed surface of said article, a sheath of metal enveloping said plastic tube and having multiple perforations therethrough, said sintered plastic material having a coefficient of thermal expansion greater than said sheath of metal, and the material of said plastic tube including integral portions projecting radially outwardly within said perforations and cooperating therewith to secure said sheath and said tube against both axial and rotational movement relative to each other.

3. A tubular article of the character described comprising a substantially impervious inner tube of sintered plastic material forming an inner exposed surface of said article, a sheath of spirally wound flat sheet metal enveloping said plastic tube and having multiple perforations therethrough, said sintered plastic material having a coefficient of thermal expansion greater than said sheath of spirally wound flat sheet metal, and the material of said plastic tube including integral portions projecting radially outwardly within said perforations and cooperating therewith to secure said sheath and said tube against both axial and rotational movement relative to each other.

4. A tubular article of the character described comprising a substantially impervious inner tube of spirally wound tape composed of a sintered plastic material forming an inner exposed surface of said article, a sheath of spirally wound flat sheet metal enveloping said plastic tube and having multiple perforations therethrough, said sintered plastic material having a coefficient of thermal expansion greater than said sheath of spirally wound flat sheet metal, and the material of said plastic tube including integral portions projecting radially outwardly within said perforations and cooperating therewith to secure said sheath and said tube against both axial and rational movement relative to each other.

References Cited in the file of this patent

UNITED STATES PATENTS

| | | |
|---|---|---|
| 386,307 | Emerson et al. | July 17, 1888 |
| 630,636 | Sundh | Aug. 8, 1899 |
| 1,067,991 | Kroger | July 22, 1913 |
| 1,494,099 | Cole | May 13, 1924 |
| 1,540,563 | Oliver | June 2, 1925 |
| 1,949,135 | Wirth | Feb. 27, 1934 |
| 2,244,557 | Iknayar | June 3, 1941 |
| 2,266,227 | Mall | Dec. 16, 1941 |
| 2,456,615 | Berglund | Dec. 21, 1948 |
| 2,690,769 | Brown | Oct. 5, 1954 |
| 2,714,746 | Meyer | Aug. 9, 1955 |
| 2,724,672 | Rubin | Nov. 22, 1955 |
| 2,748,805 | Winstead | June 5, 1956 |
| 2,821,092 | Cordora | Jan. 28, 1958 |
| 2,867,241 | Harris | Jan. 6, 1959 |